United States Patent
Lee et al.

(10) Patent No.: US 10,158,699 B2
(45) Date of Patent: *Dec. 18, 2018

(54) METHOD AND APPARATUS FOR SUBMITTING USER CONTENT IN DCD SERVICE

(71) Applicant: Samsung Electronics Co., Ltd., Gyeonggi-do (KR)

(72) Inventors: Ji-Hye Lee, Gyeonggi-do (KR); Hae-Young Jun, Gyeonggi-do (KR); Seok-Hoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 511 days.

This patent is subject to a terminal disclaimer.

(21) Appl. No.: 14/447,144

(22) Filed: Jul. 30, 2014

(65) Prior Publication Data

US 2014/0344416 A1 Nov. 20, 2014

Related U.S. Application Data

(63) Continuation of application No. 12/538,576, filed on Aug. 10, 2009, now Pat. No. 8,825,742.

(30) Foreign Application Priority Data

Aug. 8, 2008 (KR) .................. 10-2008-0078135

(51) Int. Cl.
*G06F 15/16* (2006.01)
*H04L 29/08* (2006.01)
*H04W 4/18* (2009.01)
*H04W 4/20* (2018.01)

(52) U.S. Cl.
CPC ............. *H04L 67/10* (2013.01); *H04L 67/04* (2013.01); *H04W 4/18* (2013.01); *H04W 4/20* (2013.01)

(58) Field of Classification Search
CPC ...................................................... H04L 67/10
See application file for complete search history.

(56) References Cited

U.S. PATENT DOCUMENTS

2003/0055826 A1 3/2003 Graham
2004/0268142 A1 12/2004 Karjala et al.
(Continued)

FOREIGN PATENT DOCUMENTS

CN 1 922 852 2/2007
CN 101141479 3/2008
(Continued)

OTHER PUBLICATIONS

OMA, "Dynamic Content Delivery Technical Specification—Session and Transactions", OMA-TS-DCD_Semantics-V1_0-20080716-D, Draft Version 1.0, Jul. 16, 2008.
(Continued)

*Primary Examiner* — Hua Fan
(74) *Attorney, Agent, or Firm* — The Farrell Law Firm, P.C.

(57) ABSTRACT

Disclosed is a method for updating or sharing content by a terminal, including generating a request for updating or sharing content, transmitting the request to a server, wherein the server transmits a notification that the content is shared to the at least one terminal if a first element in an information element of the request indicates that the content is the public content, and receiving, from the server, updated content or an indication for displaying the content if the content is updated or is to be displayed on the terminal based on the condition.

16 Claims, 3 Drawing Sheets

(56) References Cited

U.S. PATENT DOCUMENTS

| | | |
|---|---|---|
| 2005/0086293 A1 | 4/2005 | Buckley |
| 2006/0020661 A1* | 1/2006 | Rhim .................. H04L 67/32 709/203 |
| 2006/0184947 A1* | 8/2006 | Endo .................. G06F 9/466 718/104 |
| 2007/0260673 A1 | 11/2007 | Shenfield et al. |
| 2007/0260674 A1 | 11/2007 | Shenfield |
| 2008/0086752 A1 | 4/2008 | Perez |
| 2008/0260673 A1 | 10/2008 | Hoffmann et al. |
| 2008/0262912 A1 | 10/2008 | Gargi |
| 2013/0063479 A1 | 3/2013 | Butlin et al. |

FOREIGN PATENT DOCUMENTS

| | | |
|---|---|---|
| EP | 1 853 026 | 11/2007 |
| EP | 1 853 044 | 11/2007 |
| EP | 1 853 045 | 11/2007 |
| EP | 1 898 597 | 3/2008 |
| JP | 2005-346492 | 12/2005 |
| JP | 2006-067363 | 3/2006 |
| JP | 2007-036830 | 2/2007 |
| KR | 1020070107591 | 11/2007 |
| KR | 1020070107592 | 11/2007 |
| WO | WO 01/65376 | 9/2001 |

OTHER PUBLICATIONS

OMA, "Dynamic Content Delivery Architecture", Draft Version 1.0, OMA-AD-DCD-V1_020080501-D, May 1, 2008.

Open Mobile Alliance, "Dynamic Content Delivery Technical Specification—Session and Transactions", OMA-TS-DCD_Semantics-V1_0-20080425-D, Draft Version 1.0, Apr. 25, 2008.

* cited by examiner

METHOD AND APPARATUS FOR SUBMITTING USER CONTENT IN DCD SERVICE

PRIORITY

This application is a Continuation Application of U.S. application Ser. No. 12/538,576, which was filed in the U.S. Patent and Trademark Office on Aug. 10, 2009, and claims priority under 35 U.S.C. § 119(a) to a Korean Patent Application filed in the Korean Intellectual Property Office on Aug. 8, 2008 and assigned Serial No. 10-2008-0078135, the entire disclosure of which is hereby incorporated by reference.

BACKGROUND OF THE INVENTION

1. Field of the Invention

The present invention relates to a method and apparatus for delivering content in a Dynamic Content Delivery (DCD) service. More particularly, the present invention relates to a method and apparatus for submitting user-created content to share with other users.

2. Description of the Related Art

Due to the development of communication technologies, mobile communication, which focused on voice calls at its initial stage, is now introducing to the market messaging services such as Short Message Service (SMS) and Multimedia Messaging Service (MMS), and various supplementary services such as Internet access service and video call service, and is also considering the introduction of personalized content delivery services taking into account the fact that a majority of mobile communication devices are carried by individuals.

Considering such market characteristics, Open Mobile Alliance (OMA), which has established many application layer standards for portable terminals, is conducting research on a Dynamic Content Delivery (DCD) technology in the OMA Content Delivery (CA) Working Group, it's the OMA affiliated organization. DCD is a technology capable of providing services that deliver user-desired contents on a personalized basis in line with the situations that practical application of Internet services on mobile terminals is not made because of the market demands stated above, the inconvenient searches, the limited input means, and the low service speeds, and with the growing user demands for personalized services.

Problems of the prior art and solutions for addressing the same will be described clearly below based on an OMA CD technology, which is one of the content provision standards. However, this is a mere example used to give better understanding of the invention, and the present invention is not limited to the OMA CD technology and can be applied to various other content provision technologies.

FIG. 1 illustrates the architecture and interface configuration of a DCD service system to which the present invention is applicable.

Referring to FIG. 1, the DCD system includes a DCD client 120 and a DCD server 110. The DCD client 120 is located in a mobile terminal and used by the mobile terminal to access the DCD server 110. The DCD client 120 includes modules that perform their associated three logical functions: a Subscription and Administration function, a Content Delivery and Storage Management function, and a Client Application Interaction function. The Subscription and Administration function module 121 is responsible for exchanging service administration information with the DCD server 110, and the Content Delivery and Storage Management function module 123 is responsible for managing content received from the DCD server 110. The Client Application Interaction function module 125 supports functions for accessing the DCD service from a DCD Enabled Client Application 20 using its DCD client 120.

The DCD server 110 offers a network function based on DCD service-related applications. The DCD server 110 includes modules that perform their associated two logical functions: a Subscription and Administration function and a Distribution and Adaptation function. The Subscription and Administration function module 111 is responsible for exchanging service administration information with the DCD client 120, and the Distribution and Adaptation function module 113 provides DCD content and a DCD content notification to the DCD client 120. Table 1 below defines interfaces used between the components (logical entities) in FIG. 1.

TABLE 1

| Interfaces | Definition |
|---|---|
| DCD-1 | Bi-directional point-to-point interface between the DCD Server and the DCD Client. This interface is used by the DCD Client to send content requests to the DCD Server, and to receive responses. |
| DCD-2 | Uni-directional interface between the DCD Server and the DCD Client. This interface is used by the DCD Server to push notifications and/or content to the DCD Client. The DCD-2 interface could manifest itself as point-to-point push interface or point-to-multipoint broadcast interface. |
| DCD-3 | Bi-directional point-to-point interface between the DCD Server and the DCD Client. This interface is used by the DCD Server and the DCD Client to exchange service administration and configuration information. |
| DCD-CPR | Uni-directional interface between the DCD Content Provider and the DCD Server. This interface is used by the Content Provider to register new content channels with the DCD Server. |
| DCD-CPDE | Bi-directional interface between the DCD Content Provider and the DCD Server. This interface is used by the Content Provider to publish content at the DCD Server and by the DCD Server to retrieve content from the Content Provider. The interface could also be used for exchange of administration information, if applicable. While the interface is bi-directional, only the DCD Server provided interface functions are a subject for standardization. |
| DCD-CAR | Uni-directional interface between the DCD-Enabled Client Application and the DCD Client. This interface is used by the DCD-Enabled Client Application to register with the DCD Client when the application is installed on a handset. |
| DCD-CADE | Bi-directional interface between the DCD-Enabled Client Application and the DCD Client. This interface is used by the DCD Client to send notifications and/or content to the DCD-Enabled Client Application and by the DCD-Enabled Client Application to retrieve content from the DCD Client. |

TABLE 1-continued

| Interfaces | Definition |
|---|---|
| | The interface could also be used for exchange of administration information, if applicable. While the interface is bi-directional, only the DCD Client provided interface functions are a subject for standardization. |

In the DCD system, content metadata (Metadata, Content Format) is defined to deliver content. The term "content metadata" refers to dynamic settings and rules, or content information, for controlling DCD content delivery. Table 2 below gives definitions of elements and attributes in the content metadata.

TABLE 2

| Name | Type | Cardinality | Description | Data Type | Used by | Originated from | Provided to DECA (DCD Enabled Client Application) |
|---|---|---|---|---|---|---|---|
| content-metadata | E | 1 | Contains the following attributes: content-updated content-id channel-id mime-type content-length content-types content-name replaces-content-id content-price content-delivery-notification delivery-priority content-encoding content-address content-storage-location content-block-id parental-rating deliver-to deliver-at content-expiration delivery-spread deliver-when-roaming network-selection aux-content-link Contains the following sub-elements deliver-per-location deliver-per-presence deliver-per-xdms | Structure | DS (DCD Server), DC (DCD Client) | CP (Content Provider) | YES |
| content-updated | A | 0 . . . 1 | Time when the content item was last updated. SHALL conform to the "date-time" definition in [RFC3339]. In addition, an uppercase "T" character SHALL be used to separate date and time, and an uppercase "Z" character SHALL be present in the absence of a numeric time zone offset. | String | DC | CP, DS | YES |

TABLE 2-continued

| Name | Type | Cardinality | Description | Data Type | Used by | Originated from | Provided to DECA (DCD Enabled Client Application) |
|---|---|---|---|---|---|---|---|
| content-id | A | 1 | Identifier set by the Content Provider, and unique within the DCD Service Provider's domain. The main purpose of the content ID is to enable application level confirmation and resumption of content delivery. Implementation in XML schema will use the "AnyURI" data type. | String | DS, DC | CP | YES |
| channel-id | A | 0 . . . 1 | A list of Channel IDs as assigned by the DCD Server. The Content Provider includes this attribute to associate content items with DCD channels | List of Strings | DS, DC | CP | YES |
| mime-type | A | 1 | The MIME type of the content item. | String | DS, DC | CP | YES |
| content-length | A | 1 | The size in bytes of the content item. | String | DS, DC | CP, DS | YES |
| content-types | A | 0 . . . 1 | A list of strings that describe the channel content to enable association or filtering e.g. by "type", "category", "tag", or "relation" | List of Strings |  | CP | YES |
| content-name | A | 0 . . . 1 | Name of content in a human readable format. | String |  | CP | YES |
| replaces-content-id | A | 0 . . . 1 | Content ID of an outdated content item that, if present in the storage of the DCD Server or DCD Client, should be replaced with this content item. Implementation in XML schema will use the "AnyURI" data type. | String | DS, DC | CP | YES |
| content-price | A | 0 . . . 1 | Indicates the price (amount and currency) of this content item. The purpose is to let the user know the price of the content and decide if he wants to retrieve it | String | DC | CP, DS | YES |

TABLE 2-continued

| Name | Type | Cardinality | Description | Data Type | Used by | Originated from | Provided to DECA (DCD Enabled Client Application) |
|---|---|---|---|---|---|---|---|
| content-delivery-notification | A | 0 . . . 1 | Indicates the need for, or status of, delivery acknowledgement for this content item. This attribute should be set to "true" if user is charged for delivery of this content item (subject to DCD Service Provider Policy) Values: 0—False (*) 1—True | Boolean | DS, DC | CP, DS | NO |
| delivery-priority | A | 0 . . . 1 | The delivery priority associated with this content item. Values: 1—Low 2—Medium (*) 3—High 4—Emergency | Enumerated | DS, DC | CP, DS | NO |
| content-encoding | A | 0 . . . 1 | Encoding that has been applied to the content item, e.g. GZIP or deflate compression. | String | DC | DS | NO |
| content-address | A | 0 . . . 1 | An address (URL) where the content item can be directly retrieved by the DCD Client via the DCD-1 interface. | String | DC | DS | YES |
| content-storage-location | A | 0 . . . 1 | Location of the content item in the DCD Client managed storage | String | DC | DC | YES |
| content-block-id | A | 1 | Identifies which multiple content items can be associated as a block. May be used by the DCD Server for content aggregation/bundling. | String | DS | CP | YES |
| parental-rating | A | 0 . . . 1 | Content rating per FCC "TV Parental Guidelines" or similar local regulatory requirements. May be used by the DCD Server for content selection/filtering, and by DCD Client for the same in the broadcast case. | String | DS, DC | CP | YES |
| deliver-to | A | 0 . . . 1 | A particular set of users to receive the content. | String | DS | CP | NO |

TABLE 2-continued

| Name | Type | Cardinality | Description | Data Type | Used by | Originated from | Provided to DECA (DCD Enabled Client Application) |
|---|---|---|---|---|---|---|---|
| deliver-at | A | 0 . . . 1 | Time at which the DCD Server should deliver a content item. | String | DS | CP | NO |
| content-expiration | A | 0 . . . 1 | The expected lifetime of the content item in device storage, and the time until which the content item can be directly retrieved (if a content address attribute was provided). | String | DS, DC | CP | YES |
| delivery-spread | A | 0 . . . 1 | The period over which the DCD Server can randomize delivery, for the purpose of load spreading. | String | DS | CP | NO |
| deliver-when-roaming | A | 0 . . . 1 | Indicates whether the content item should be automatically delivered or retrieved via point-to-point interfaces if the user is roaming Values: 0—False (*) 1—True | Boolean | DS | CP | NO |
| network-selection | A | 0 . . . 1 | Descending priority-ordered, comma-separated list of network/bearer types for use in content delivery, selected per arbitrary deployment-specific criteria for network selection (e.g. GPRS vs. UMTS vs. Wi-Fi) based on delivery cost, bandwidth, quality of service, etc. DCD Client and DCD Server apply these criteria for content delivery over DCD-1 and DCD-2 interfaces. One or more of "UMTS", "WiMAX", "LTE", "802.11", "CBS", "BCAST". | String | CP, DS, | DS | NO |
| aux-content-link | A | 0 . . . 1 | Provides the Content ID or link to additional content that is related to the content being delivered. The intent is to | String | DS, DC | CP, DS | NO |

TABLE 2-continued

| Name | Type | Cardinality | Description | Data Type | Used by | Originated from | Provided to DECA (DCD Enabled Client Application) |
|---|---|---|---|---|---|---|---|
| | | | support pre-fetching content referred to by the main content item or likely to be requested later. | | | | |
| deliver-per-location | E1 | 0 . . . 1 | A rule for matching a location at which delivery should be allowed. The rule should be specified by the DCD Content Provider, the DCD Server, or the DCD Enabled Client Application based on the format published by the Service Provider | String | DS | CP | NO |
| deliver-per-presence | E1 | 0 . . . 1 | A rule for allowing delivery based upon matching a Presence attribute | String | DS | CP | NO |
| deliver-per-xdms | E1 | 0 . . . 1 | A rule for allowing delivery based upon matching a XDMS attribute. | String | DS | CP | NO |

In the prior art, the content metadata for content delivery is generally used only when content is created by the DCD server or content provider and delivered from the DCD server to the DCD client.

The DCD client can also deliver (submit) content to the DCD server according to the prior art. However, in the prior art, when the DCD client submits content, the DCD client delivers the content in the form of an opaque content package that the DCD system cannot interpret, without delivering the content metadata. Thus, the DCD server can not comprehend the content information, making it inefficient to post or share the content, and error is apt to occur.

SUMMARY OF THE INVENTION

The present invention is designed to address at least the above-mentioned problems and/or disadvantages and to provide at least the advantages described below. Accordingly, an aspect of the present invention provides an apparatus and method for submitting user-created content to share with other users.

Another aspect of the present invention provides a method and system in which a user creates content according to a predetermined rule and submits the content with information such as a submit address, a data or media type, a label (or tag), etc., of the content, so that a DCD service provider can easily handle the content after receiving it.

According to one aspect of the present invention, there is provided a method for updating or sharing content by a terminal, including generating a request for updating or sharing content, wherein the request comprises at least one of a content identifier for the content and the content, and an information element including a first element indicating whether the content is a public content for sharing with at least one terminal and a second element indicating a condition for updating the content or displaying the content on the terminal, transmitting the request to a server, wherein the server transmits a notification that the content is shared to the at least one terminal if the first element indicates that the content is the public content, and receiving, from the server, updated content or an indication for displaying the content if the content is updated or is to be displayed on the terminal based on the condition.

According to another aspect of the present invention, there is provided a terminal for updating or sharing content, including a processor for generating a request for updating or sharing content, wherein the request comprises at least one of a content identifier for content and the content, and an information element including a first element indicating whether the content is a public content for sharing with at least one terminal and a second element indicating a condition for updating the content or displaying the content on the terminal, and a transceiver for transmitting the request to a server, wherein the server transmits a notification that the content is shared to the at least one terminal if the first element indicates that the content is the public content, and receiving, from the server, updated content or an indication for transmitting the content if the content is updated or is to be displayed on the terminal based on the condition.

According to another aspect of the present invention, there is provided a method for updating or sharing content by a server, including receiving, from a terminal, a request for updating or sharing content, wherein the request comprises at least one of a content identifier for the content and the content, and an information element including a first element indicating whether the content is a public content for sharing with at least one terminal and a second element indicating a condition for updating the content or displaying the content on the terminal, transmitting a notification that the content is shared to the at least one terminal if the first element indicates that the content is the public content, and transmitting updated content or an indication for displaying the content if the content is updated or is to be displayed to the terminal based on the condition.

According to another aspect of the present invention, there is provided a server for updating or sharing content, including a transceiver for receiving, from a terminal, a request for updating or sharing content, wherein the request comprises at least one of a content identifier for the content and the content, and an information element including a first element indicating whether the content is a public content for sharing with at least one terminal and a second element indicating a condition for updating the content or displaying the content to the terminal, and a processor for controlling the transceiver to transmit a notification that the content is shared to the at least one terminal if the first element indicates that the content is the public content, and to transmit updated content or an indication for displaying the content if the content is updated or is to be displayed on the terminal based on the condition.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Figure 1:
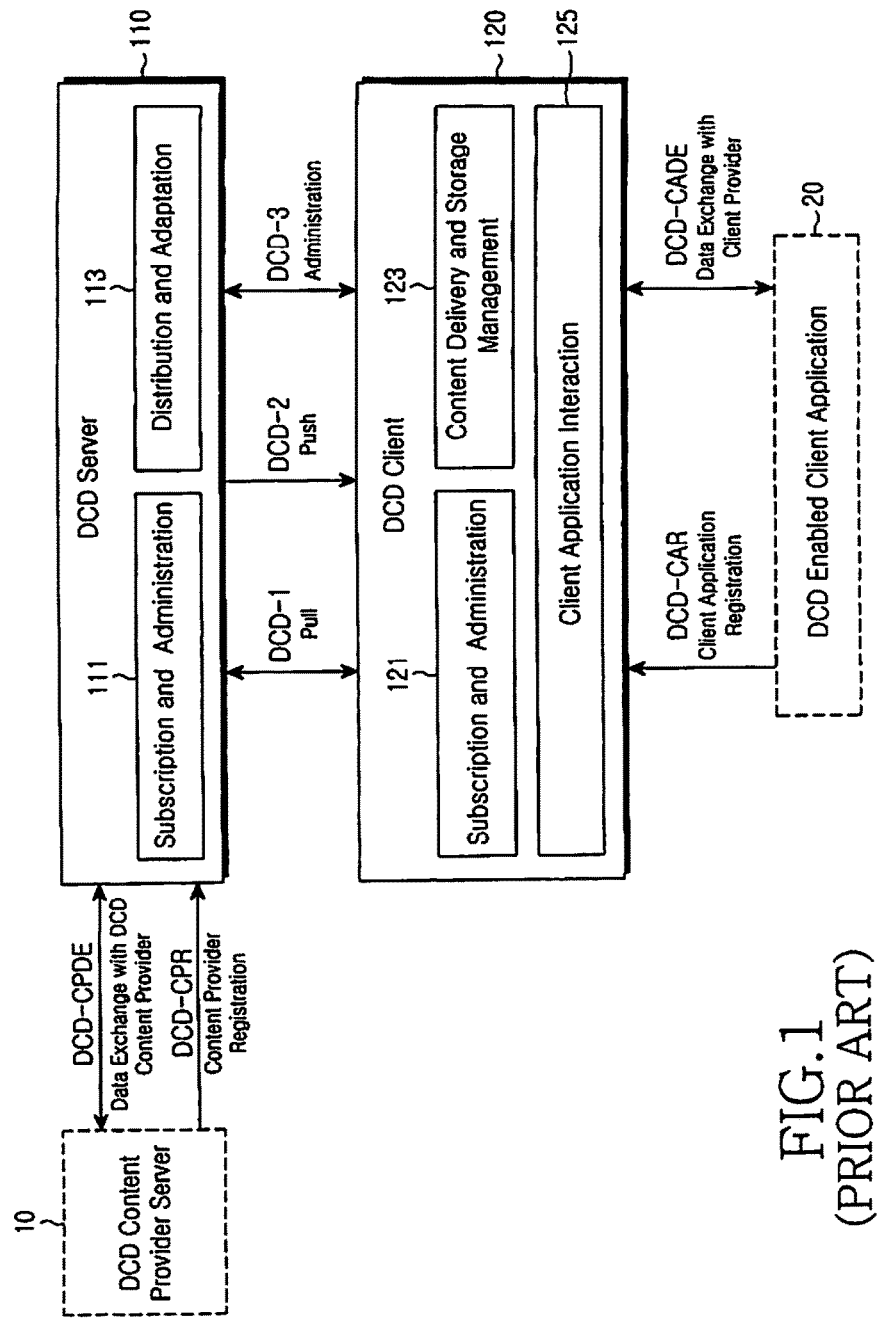
FIG. 1 illustrates architecture and interface configuration of a DCD service system to which the present invention is applicable.

The matters defined in the description such as a detailed construction and elements are provided to assist in a comprehensive understanding of embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Various embodiments of the present invention will be described below. Although the names of entities defined in the 3$^{rd}$ Generation Partnership Project (3GPP), which is the asynchronous mobile communication standard, or in the DCD of the Open Mobile Alliance (OMA), which is a standard organization for applications of mobile terminals, will be used for a description of the present invention for convenience purposes only, it is not intended to limit the scope of the invention, and the present invention can be applied to any similar systems.

The content submission according to the present invention can also be used for various other purposes in addition to its main purpose of directly submitting certain content created by a user to share it with other users. For example, according to the content submission, the user may submit content for submitting a keyword and/or a format needed to search for specific content, and may also submit content with a user preference to receive personalized services. Besides, the user may submit content for his subscription to a DCD content provider server. The user may also submit the content provided from an arbitrary service provider, e.g., newspaper articles.

The purposes of the content submission by the user can be divided into a purpose of submitting content to receive other content associated with the submitted content, and other purposes, for example, for simply submitting content to a specific site or channel.

An example of the former case where the user submits content to receive specific content will be described with reference to FIG. 2, while an example of the latter case where the user simply submits content will be described with reference to FIG. 3.

In an embodiment of the present invention, a DCD Enabled Client Application 20 and a DCD client 120 are included in a mobile terminal. A DCD server 110 includes a transceiver (not shown) for performing communication by exchanging messages with the DCD client 120, a content provider (or DCD content provider server) 10, and a personalization source (or personalization information provider) 30, and a processor (not shown) for controlling the message exchange and handling the exchanged messages. In the following description, the processor performs operations associated with various message handling processes of the DCD server 110. The DCD Enabled Client Application 20, the DCD client 120, the DCD server 110, the content provider 10, and the personalization source 30 perform not only the conventional functions and operations, but also the functions and operations of the invention described below.

Figure 2:
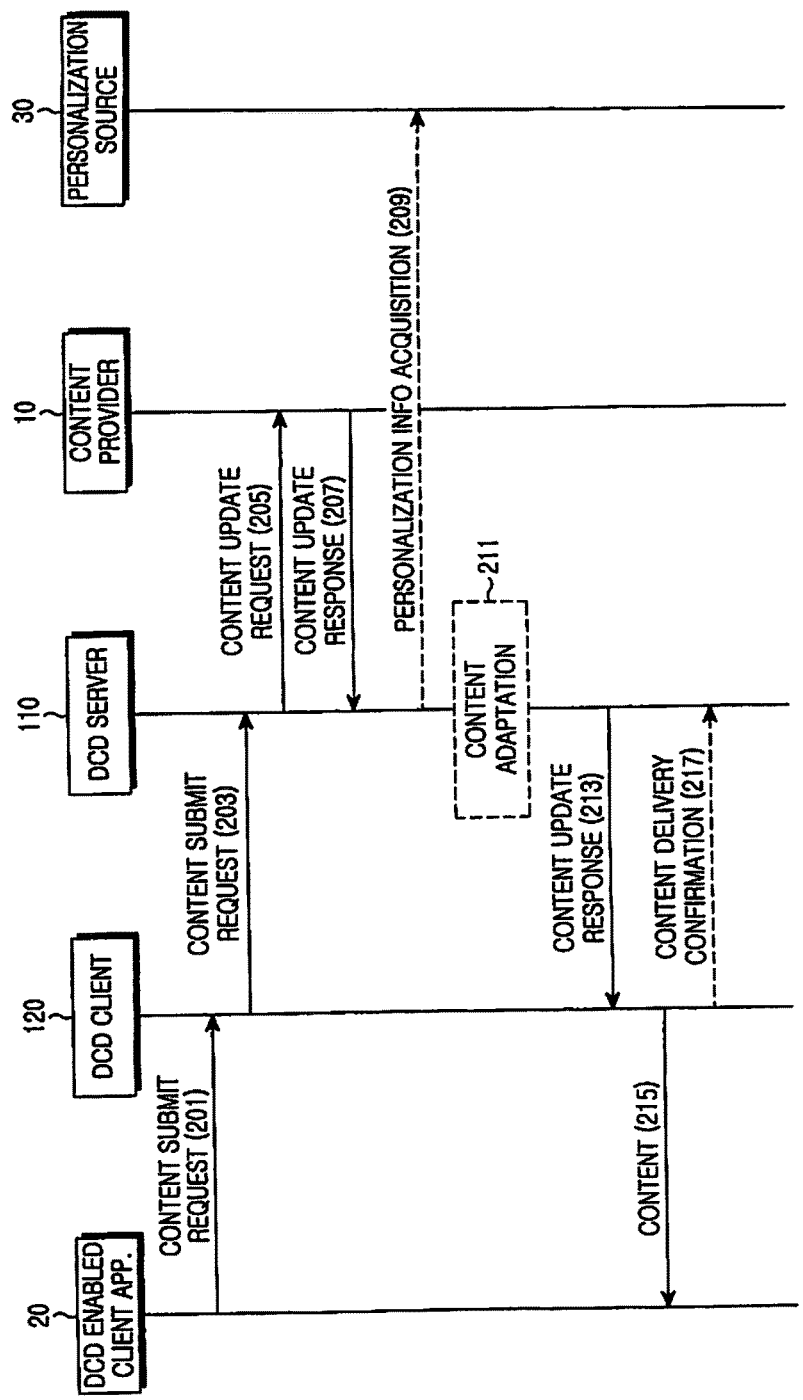
FIG. 2 illustrates a process in which a user submits DCD content to a DCD server and receives DCD content associated with the submitted DCD content according to an embodiment of the present invention.

Referring to FIG. 2, a user creates content to be submitted, using the DCD Enabled Client Application 20, and then requests content submission by sending in step 201 a ContentSubmit Request message to the DCD client 120. The user can compose the content to be submitted, according to a predetermined format. In step 203, the DCD client 120 properly adjusts information elements in the ContentSubmit Request message and sends in step 203 the resulting message to the DCD server 110.

The information elements included in the ContentSubmit Request message sent in step 201 are as shown in Table 3 below, and the information elements additionally included in the ContentSubmit Request message sent in step 203 are as shown in Table 4 below.

TABLE 3

| Information Element | Req | Type | Description |
| --- | --- | --- | --- |
| Application-ID | Mandatory | String | Application identifier of the DCD-Enabled Client Application to which this message is related. |
| Channel-ID | Mandatory | String | ID of channel related to the submitted content. |
| Submit-Metadata | Mandatory | Structure | DCD Submit Metadata as provided by the DCD enabler. |
| Submit-Content | Mandatory | Opaque Data | Content to be submitted. |

TABLE 4

| Information Element | Req | Type | Description |
|---|---|---|---|
| Session-ID | Mandatory | String | Session identifier. The Session-ID is unique within the service provider domain. If there is an established Session, a Session-ID SHALL be present. |
| Message-ID | Mandatory | String | Identifies this message. The Message-ID is unique within a current session. Message identifier consists of the transaction identifier suffixed by two numeric characters for message index within the transaction. Transaction identifier offset is unique within the current session and identical for all messages within the transaction. |
| Channel-ID | Mandatory | String | ID of channel related to the submitted content. |
| Submit-Package | Mandatory | list of data structures | One or more submit packages. The submit package consists of content payload and submit metadata. If Channel-ID element is present in the message all items in Submit-Package element belong to the same channel (identified by Channel-ID element). |

In accordance with the present invention, the user's DCD Enabled Client Application 20 and DCD client 120 include Submit-Metadata, Submit-Content, Submit-Package, etc. in the ContentSubmit Request message for content submission in order to include therein information related to the content to be submitted.

As is defined in Table 4, the Submit-Package includes Submit-Metadata and Submit-Content, and the Submit-Metadata may include the information given in Table 5 below according to the present invention.

TABLE 5

| Name | Type | Cardinality | Description | Data Type | Used by | Originated from | Provided to DECA |
|---|---|---|---|---|---|---|---|
| content-metadata | E | 1 | Contains the following attributes: content-updated content-id channel-id mime-type content-length content-types content-name replaces-content-id content-price content-delivery-notification delivery-priority content-encoding content-address content-storage-location content-block-id parental-rating deliver-to deliver-at content-expiration delivery-spread deliver-when-roaming network-selection aux-content-link Contains the following sub-elements deliver-per-location deliver-per-presence deliver-per-xdms | Structure | DS, DC | CP | YES |
| submit-address | A | 0 . . . 1 | An address (URI or URL) to which the DCD enabler should deliver the submit request. | String | DC, DS | DECA | YES |
| submit-content-id | A | 0 . . . 1 | Identifier set by the DECA, and unique within the DCD Service Provider's domain. | String | DC, DS | DECA | YES |
| display-position | A | 0 . . . 1 | The position where the content to be displayed if there is an agreed layout between DECA and CP. | List of Strings | DC, DS | DECA | YES |

TABLE 5-continued

| Name | Type | Cardinality | Description | Data Type | Used by | Originated from | Provided to DECA |
|---|---|---|---|---|---|---|---|
| format | A | 0 . . . 1 | The format of submitted content (e.g. jpg, gif, txt, etc.) | List of Strings | DC, DS | DECA | YES |
| scrap | A | 1 | Indicates whether the submitted content is allowed to scrap or not. | String | DC, DS | DECA | YES |
| private | A | 1 | Indicates whether the submitted content is private or open to public. | String | DC, DS | DECA | YES |
| bookmark | A | 0 . . . 1 | A point which has lastly submitted content. | String | DC, DS | DECA | YES |
| media-type | A | 0 . . . 1 | Media type of the submitted content (e.g. audio, video, image, text, etc.) | List of Strings | DC, DS | DECA | YES |

As illustrated in Table 5, the Submit-Metadata includes information such as the relevant content's 'submit-address', 'submit-content-id', 'display-position', 'format', 'scrap', 'private', 'bookmark', 'label' (or 'tag'), 'media-type', etc. In particular, the 'display-position', which is information indicating in which position the relevant content should be stored or displayed, can be designated by the user. Also, the Submit-Metadata may indicate if the content to be submitted is to be simply stored, or requests other content associated with the content to be submitted. Accordingly, the submitted content can be administered by the DCD server 110, and shared even by other users. Because the Submit-Metadata means supplementary metadata that can be used only when content to be submitted is added to the conventional content metadata, the Submit-Metadata may include the existing content metadata.

Referring back to FIG. 2, upon receipt of the Content-Submit Request message, the DCD server 110 sends in step 205 a ContentUpdate Request message to the content provider 10 referring to Submit-Metadata included in the ContentSubmit Request message in order to request content update. Information elements included in the ContentUpdate Request message are as shown in Table 6 below.

TABLE 6

| Information Element | Req | Type | Description |
|---|---|---|---|
| Channel-ID | Mandatory | String | Channel identifier for the channel offered by the content provider |
| Subscription-IDs | Conditional | String | Comma separated list of subscription identifiers. Present, if requesting user has subscription IDs associated with this channel. |
| Submit-Package | Conditional | list of data structures | One or more submit packages. The submit package consists of content payload and submit metadata. If Channel-ID element is present in the message all items in Submit-Package element belong to the same channel (identified by Channel-ID element). SHALL be present if the ContentUpdateRequest was initiated by a DCD-1 ContentSubmitRequest. |

Upon receipt of the ContentUpdate Request message, the content provider 10 updates the content referring to Submit-Metadata included in the ContentUpdate Request message. The updated content may be shared by other users according to the settings of the Submit-Metadata. The content provider 10 determines whether other content related to the submitted content to the user should be provided, by analyzing the Submit-Metadata. If there is a need to provide other content as a result of the determination, the content provider 10 sends in step 207 a ContentUpdate Response message to the DCD server 110. Information elements given in Table 7 below are included in the ContentUpdate Response message.

TABLE 7

| Information Element | Req | Type | Description |
|---|---|---|---|
| Content-Package | Conditional | List of Data Structures | One or more content packages. The content package consists of content payload and content metadata. Content |

TABLE 7-continued

| Information Element | Req | Type | Description |
|---|---|---|---|
| | | | payload could be empty if content-address parameter of the content metadata contains the address where the content could be retrieved (e.g. URI). This parameter is present when the DCD Content Provider has updated content to return to the DCD Enabler. |

Upon receipt of the ContentUpdate Response message, the content provider 10 sends in step 209 a Personalization Info Acquisition message to a personalization source 30 to acquire personalization information, and performs content adaptation in step 211. Through steps 207, 209 and 211, the DCD server 110 searches for or composes new content associated with the content submitted by the user. In step 213, the DCD server 110 sends a ContentUpdate Response message to the DCD client 120 in order to inform the user of the content updated state and provide the content requested by the user. The user requested content may be either specific content or report information indicating the execution result of the content submitted by the user. The ContentUpdate Response message includes information elements given in Table 8 below.

TABLE 8

| Information Element | Req | Type | Description |
|---|---|---|---|
| Session-ID | Mandatory | String | Session identifier. The Session-ID is unique within the service provider domain. If there is an established Session, a Session-ID SHALL be present. |
| Message-ID | Mandatory | String | Identifies this message. The Message-ID is unique within a current session. Message identifier consists of the transaction identifier suffixed by two numeric characters for message index within the transaction. Transaction identifier offset is unique within the current session and identical for all messages within the transaction. |
| Channel-ID | Optional | String | ID of the channel related to the content package. If absent, the content metadata in the Content-Package element SHALL contain Channel-ID attribute. |
| Content-Package | Mandatory | List of Data Structures | One or more content packages. The content package consists of content payload and content metadata. Content payload could be empty if content-address parameter of the content metadata contains the address where the content could be retrieved (e.g. URI). If Channel-ID element is present in the message all items in Content-Package element belong to the same channel (identified by Channel-ID element). |

Upon receipt of the ContentUpdate Response message, the DCD client 120 detects content included in the received ContentUpdate Response message, and sends in step 215 a Content message including the detected content to the DCD Enabled Client Application 20. Information elements included in the Content message are as shown in Table 9.

TABLE 9

| Information Element | Req | Type | Description |
|---|---|---|---|
| Content-Metadata | Mandatory | Structure | DCD Content Metadata (see Table 2) as provided by the DCD enabler. |
| Content | Optional | Opaque Data | Opaque DCD Content for the DCD-Enabled Client Application. |

In step 217, the DCD client 120 sends a ContentDelivery Confirmation message for content reception confirmation to the DCD server 110.

Next, with reference to FIG. 3, a description will be made of the case where the user only aims to submit content.

Figure 3:
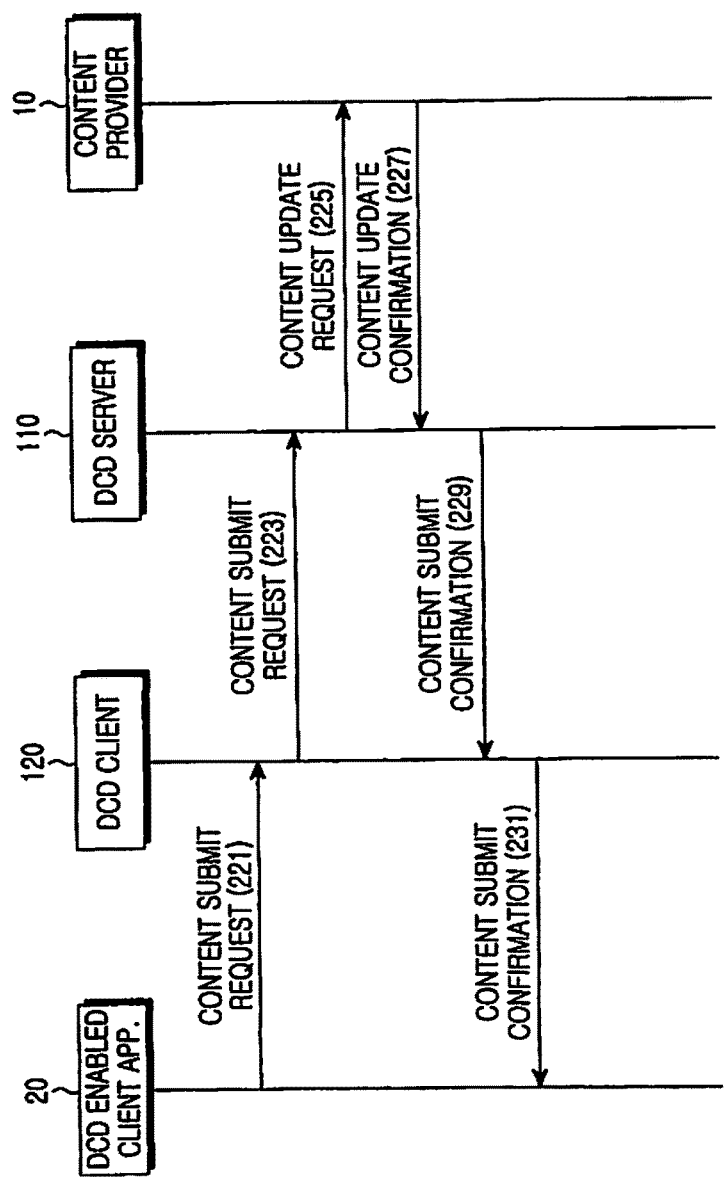
FIG. 3 illustrates a process in which a user submits DCD content to a DCD server according to an embodiment of the present invention.

Steps 221 to 225 in FIG. 3 are identical to steps 201 to 205 in FIG. 2, and the messages, which are sent in the corresponding steps, are also identical.

However, because the embodiment shown in FIG. 3 is aimed at content submission only, the content provider 10, which received the ContentUpdate Request message, stores the received content and then sends in step 227 a ContentUpdate Confirmation message to the DCD server 110 as a message for informing the completion of the user's content submission. Upon receipt of the ContentUpdate Confirmation message, the DCD server 110 sends in step 229 a ContentSubmit Confirmation message to the DCD client 120. Information elements included in the ContentUpdate Confirmation message are as shown in Table 10 below.

TABLE 10

| Information Element | Req | Type | Description |
|---|---|---|---|
| Session-ID | Mandatory | String | Session identifier. The Session-ID is unique within the service provider domain. If there is an established Session, a Session-ID SHALL be present. |
| Message-ID | Mandatory | String | Identifies this message. The Message-ID is unique within a current session. Message identifier consists of the transaction identifier suffixed by two numeric characters for message index |

TABLE 10-continued

| Information Element | Req | Type | Description |
|---|---|---|---|
| | | | within the transaction. Transaction identifier offset is unique within the current session and identical for all messages within the transaction. |

Upon receipt of the ContentSubmit Confirmation message, the DCD client 120 forwards in step 231 the received message to the DCD Enabled Client Application 20. The ContentSubmit Confirmation message serves as a notification message that indicates the completion of content submission as an internal operation of the terminal.

As is apparent from the foregoing description, embodiments of the present invention submit, to a DCD content provider server, content that a user created according to a predetermined rule or format and that includes additional information related to the content, so that the DCD content provider server can store or classify the DCD content and easily control the DCD content when sharing it with other users.

The embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the present invention has been shown and described with reference to certain embodiments thereof, it will be understood by those skilled in the art that various changes in form and details may be made therein without departing from the spirit and scope of the invention as defined by the appended claims and their equivalents. For example, the DCD system is an example of a user content system, which delivers user content, and the DCD client and the DCD server are also examples of a user content client and a user content server in the user content system. Further, the DCD Enabled Client Application is also an example of user content Enabled Client Application.

What is claimed is:

1. A method for updating or sharing content by a terminal, comprising:
generating, using a client application, a request for updating or sharing a first version of content, wherein the request comprises the first version of the content, a first information element, a second information element, a third information element and an application identifier of the user client application, the first information element indicates whether the first version of the content is private content or public content for sharing with at least one terminal, the second information element indicates a condition for updating the first version of the content, and the third information element indicates a network for use in content delivery between the terminal and a server;
transmitting the request to the server, wherein the server transmits a notification that the first version of the content is shared to the at least one terminal based on the indication by the first information element that the first version of the content is the public content; and
receiving, from the server using a network indicated by the third information element, a second version of the content, based on the condition,
wherein the second version of the content is updated from the first version of the content and is different from the first version of the content.

2. The method of claim 1, wherein the condition is a time or a location of the terminal.

3. The method of claim 1, wherein receiving the second version of the content further comprises receiving a notification that the first version of the content is updated in response to new contents which is received from one of the at least one terminal by the server and is added to a package including the first version of the content.

4. The method of claim 1, further comprising displaying a reminder including the first version of the content on the terminal in response to receiving the indication, wherein the reminder is shared to the at least one terminal and displayed on the at least one terminal if the first information element indicates that the first version of the content is the public content.

5. A terminal for updating or sharing content, comprising:
a memory;
a transceiver; and
a processor configured to:
generate, using a client application, a request for updating or sharing a first version of content, wherein the request comprises the first version of the content, a first information element, a second information element, a third information element and an application identifier of the user client application, the first information element indicates whether the first version of content is private content or public content for sharing with at least one terminal, the second information element indicates a condition for updating the first version of the content, and the third information element indicates a network for use in content delivery between the terminal and a server;
control the transceiver to transmit the request to the server, wherein the server transmits a notification that the first version of the content is shared to the at least one terminal if the first information element indicates that the first version of the content is the public content; and
control the transceiver to receive, from the server using a network indicated by the third information element, a second version of the content based on the condition if the first version of the content is updated,
wherein the second version of the content is updated from the first version of the content and is different from the first version of the content.

6. The terminal of claim 5, wherein the condition is a time or a location of the terminal.

7. The terminal of claim 5, wherein the transceiver receives a notification that the first version of the content is updated in response to new contents which is received from one of the at least one terminal by the server and is added to a package including the first version of the content.

8. The terminal of claim 5, further comprising a displaying unit configured to display a reminder including the first version of the content on the terminal in response to receiving the indication, wherein the reminder is shared to the at least one terminal and displayed on the at least one terminal if the first information element indicates that the first version of the content is the public content.

9. A method for updating or sharing content by a server, comprising:
receiving, from a terminal, a request for updating or sharing a first version of content, wherein the request comprises the first version of the content, a first information element, a second information element, a third information element and an application identifier of the user client application, the first information element indicates whether the first version of the content is private content or public content for sharing with at least one terminal, the second information element indicates a condition for updating the first version of the content, and the third information element indicates a network for use in content delivery between the terminal and the server;
transmitting a notification that the first version of the content is shared to the at least one terminal based on the indication by the first element that the first version of the content is the public content; and
transmitting, using a network indicated by the third information element, a second version of the content based on the condition,
wherein the second version of the content is updated from the first version of the content and is different from the first version of the content.

10. The method of claim 9, wherein the condition is a time or a location of the terminal.

11. The method of claim 9, wherein transmitting the second version of the content further comprises transmitting a notification that the second version of the content is updated in response to new contents which is received from one of the at least one terminal by the server and is added to a package including the first version of the content.

12. The method of claim 9, wherein the terminal displays thereon a reminder including the first version of the content in response to receiving the indication, wherein the reminder is shared to the at least one terminal and displayed on the at least one terminal if the first information element indicates that the first version of the content is the public content.

13. A server for updating or sharing content, comprising:
a memory;
a transceiver; and
a processor configured to:
control the transceiver to receive, from a terminal, a request for updating or sharing a first version of content, wherein the request comprises the first version of the content, a first information element, a second information element, a third information element and an application identifier of the user client application, the first information element indicates whether the first version of the content is private content or public content for sharing with at least one terminal, the second information element indicates a condition for updating the first version of the content, and the third information element indicates a network for use in content delivery between the terminal and the server;
control the transceiver to transmit a notification that the first version of the content is shared to the at least one terminal if the first element indicates that the first version of the content is the public content; and
control the transceiver to transmit, using a network indicated by the third information element, a second version of the content based on the condition if the first version of the content is updated,
wherein the second version of the content is updated from the first version of the content and is different from the first version of the content.

14. The server of claim 13, wherein the condition is a time or a location of the terminal.

15. The server of claim 13, wherein the processor controls the transceiver to transmit a notification that the first version of the content is updated in response to new contents which is received from one of the at least one terminal by the server and is added to a package including the first version of the content.

16. The server of claim 13, wherein the terminal displays thereon a reminder including the first version of the content in response to receiving the notification, wherein the reminder is shared to the at least one terminal and displayed on the at least one terminal if the first information element indicates that the first version of the content is the public content.

* * * * *